United States Patent
Ozeki et al.

(10) Patent No.: US 7,101,309 B2
(45) Date of Patent: Sep. 5, 2006

(54) CONTROL SYSTEM AND CONTROL METHOD FOR HYBRID VEHICLES

(75) Inventors: Tatsuya Ozeki, Torrance, CA (US); Hiroatsu Endo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 81 days.

(21) Appl. No.: 10/853,221

(22) Filed: May 26, 2004

(65) Prior Publication Data

US 2004/0249524 A1 Dec. 9, 2004

(30) Foreign Application Priority Data

Jun. 5, 2003 (JP) .............. 2003-160824

(51) Int. Cl.
*B60K 1/02* (2006.01)
(52) U.S. Cl. ......................................... 477/3
(58) Field of Classification Search .................. 477/3; 903/930, 940, 942
See application file for complete search history.

(56) References Cited

U.S. PATENT DOCUMENTS

| 3,623,568 | A | | 11/1971 | Mori | |
| 5,991,683 | A | * | 11/1999 | Takaoka et al. | ............. 701/102 |
| 6,603,215 | B1 | * | 8/2003 | Kuang et al. | ............. 290/40 C |
| 6,687,581 | B1 | * | 2/2004 | Deguchi et al. | .............. 701/22 |
| 2003/0064854 | A1 | | 4/2003 | Takeshi | |
| 2004/0084233 | A1 | | 5/2004 | Wakuta et al. | |
| 2004/0192494 | A1 | | 9/2004 | Ozeki et al. | |

FOREIGN PATENT DOCUMENTS

| JP | 9-117010 | 5/1997 |
| JP | 10-341503 | 12/1998 |
| JP | 2000-156905 | 6/2000 |
| JP | 2001-158254 | 6/2001 |
| JP | 2002-47963 | 2/2002 |
| JP | 2002-51406 | 2/2002 |
| JP | 2002-225578 | 8/2002 |
| JP | 2003-32808 | 1/2003 |
| JP | 2003-278855 | 10/2003 |

* cited by examiner

*Primary Examiner*—Dirk Wright
(74) *Attorney, Agent, or Firm*—Oblon, Spivak, McClelland, Maier & Neustadt, P.C.

(57) ABSTRACT

A control system for a hybrid vehicle wherein a plurality of prime movers and wheels are connected in a power transmittable manner, comprising: a decider for deciding a power loss of a case in which a power of predetermined prime mover, which is one of a plurality of the prime movers is transmitted to a rotary member including another prime mover; and a controller for controlling a rotating state of the rotary member including said another prime mover on the basis of a decision result of the decider.

19 Claims, 5 Drawing Sheets

CONTROL SYSTEM AND CONTROL METHOD FOR HYBRID VEHICLES

BACKGROUND OF THE INVENTION

1. Field of the Invention

This invention relates to a control system and a control method for hybrid vehicles having a plurality of prime movers.

The present invention relates to the subject matter contained in Japanese Patent Application No. 2003-160824, filed on Jun. 5, 2003, which is expressly incorporated herein by reference.

2. Description of Related Art

In recent years, there has been proposed a hybrid vehicle on which an engine for outputting a torque by burning fuel and a motor generator for outputting a torque by feeding electric power thereto are mounted, and which is capable of transmitting a torque from the engine and the motor generator to wheels. In the hybrid vehicle of this kind, the fuel economy can be improved and the noise and the exhaust gas emission can be reduced by controlling a driving/halting of the engine and the motor generator on the basis of various conditions.

One example of the hybrid vehicle having a plurality of prime movers as described above is disclosed in Japanese Patent Laid-Open No. 9-117010. In the hybrid vehicle disclosed in Japanese Patent Laid-Open No. 9-117010, an output shaft of the engine is connected to a carrier of a planetary gear unit, and a first counter drive gear is connected to a ring gear of the planetary gear unit. A power is transmitted from the first counter drive gear to a differential unit through a counter driven gear, a pinion gear and the ring gear. Also, said planetary gear unit is connected to a rotor of an electric generator through a sun gear, and is provided with a brake for controlling a rotation/cessation of the rotor. Moreover, there is provided an electric motor to which a second counter drive gear is connected. The second counter drive gear and the counter driven gear are meshing with each other.

According to the hybrid vehicle disclosed in Japanese Patent Laid-Open No. 9-117010, it is possible to switch selectively among three modes such as an engine drive mode, a motor drive mode and an engine/motor drive mode. Under the engine drive mode, first of all, the engine is activated by the electric generator and the electric motor is halted. Under the motor drive mode, the electric motor is driven and the engine is halted. Under the engine/motor drive mode, both the engine and the electric motor are driven together. Namely, according to the hybrid vehicle disclosed in Japanese Patent Laid-Open No. 9-117010, it is possible not only to transmit the torque generated by the engine to the counter driven gear, but also to transmit the torque generated by the electric motor to the counter driven gear. Moreover, according to the hybrid vehicle disclosed in Japanese Patent Laid-Open No. 9-117010, it is possible to lock the rotor of the electric generator by applying the brake. In addition, a technology concerning a hybrid vehicle having a plurality of prime movers is disclosed also in Japanese Patent Laid-Open No. 2002-225578.

However, in the hybrid vehicle disclosed in Japanese Patent Laid-Open No. 9-117010, the second counter drive gear connected to the rotor of the electric motor and the counter driven gear are meshed with each other on a steady basis. As a result, the rotor of the electric motor is rotated by the power of the engine even in the engine drive mode such that only the engine is driven at a high-speed running time, thereby a power loss may become larger.

SUMMARY OF THE INVENTION

A main object of this invention is to provide a control system and a control method for hybrid vehicles which can suppress an increase of power loss, in case that the power loss is caused by a power of a predetermined prime mover out of a plurality of the prime movers transmitted to a rotary member including another prime mover.

According to the invention, there is provided a control system for a hybrid vehicle in which a plurality of prime movers and wheels are connected each other in a power transmittable manner, comprising: means or a mechanism for deciding a power loss of a case in which a power of the predetermined prime mover out of a plurality of the prime movers is transmitted to a rotary member including another prime mover; and means or a mechanism for controlling a rotating state of the rotary member including said another prime mover on the basis of a decision result.

According to the control system of the invention, therefore, the rotating state of the rotary member including another prime mover can be controlled to reduce the power loss of the case in which the power of the predetermined prime mover is transmitted to the rotary member including another prime mover. As a result, the increase of power loss can be suppressed.

In the control system according to the invention, moreover, said deciding means or mechanism includes means or a mechanism for deciding, when power is being outputted from said predetermined prime mover, a power loss resulting from concurrent rotation of another prime mover caused by the power of the predetermined prime mover.

According to the control system of the invention, therefore, the power loss resulting from concurrent rotation of another prime mover caused by the power of the predetermined prime mover is decided.

According to the invention, moreover, there is provided a control system: in which a first engagement mechanism for transmitting the torque by applying two members rotating relatively, and a second engagement mechanism for transmitting the torque by applying two members rotating relatively, are provided on the output side of said another prime mover; in which said rotary member includes a member of the first engagement mechanism, and a member of the second engagement mechanism; and in which said means or a mechanism for deciding includes a means or a mechanism for deciding a loss of said power when both of said engagement mechanisms are in a releasing state.

According to the control system of the invention, therefore, the loss of the power is decided in case both of said engagement mechanisms are brought into a releasing state and the power to be transmitted from another prime mover to the wheels is lowered.

Moreover, the control system according to the invention, said means or mechanism for controlling includes means or a mechanism for controlling a speed of said another prime mover so as to minimize a total sum of: the power loss caused by rotating said another prime mover; the power loss caused by a relative rotation between said two members of said first engagement mechanism; and the power loss caused by a relative rotation between said two members of said second engagement mechanism.

According to the control system of the invention, therefore, the speed of said another prime mover can be controlled so as to minimize the total sum of the power loss.

Moreover, the control system according to the invention further comprises a transmission having said two engagement mechanisms on a power transmission route from said another prime mover to said wheels.

According to the control system of the invention, therefore, the power of another prime mover is transmitted to the wheels through the transmission.

According to the control system of the invention, moreover, said first engagement mechanism includes a wet frictional engagement mechanism in which oil is interposed between the two members, and said second engagement mechanism includes a wet frictional engagement mechanism in which oil is interposed between the two members.

According to the control system of the invention, therefore, the power loss of the predetermined prime mover occurs in accordance with a viscosity resistance of the oil interposed between the two members of the two engagement mechanisms.

Moreover, the control system according to the invention further comprises a power distribution device for transmitting the power of said predetermined prime mover to at least one of said wheels or motor generator.

According to the control system of the invention, therefore, the power of the predetermined prime mover is transmitted to at least one of the wheels or the motor generator.

According to the control system of the invention, moreover, said means or mechanism for controlling includes means or a mechanism for controlling the rotating state of the rotary member including said another prime mover so as to minimize said power loss by using, as parameters, at least one of a vehicle speed; a temperature of the oil interposed between the two members of said two engagement mechanisms; and a temperature of a cooling water of the predetermined prime mover.

According to the control system of the invention, therefore, the rotating state of the rotary member including said another prime mover can be controlled so as to minimize the power loss by using, as parameters, at least one of: the vehicle speed; the temperature of the oil interposed between the two members of said two engagement mechanisms; and the temperature of a cooling water of the predetermined prime mover.

Furthermore, the control method of the invention is to be carried out by the aforementioned individual control system, and according to the control method of the invention, the increase of power loss of the predetermined prime mover can be suppressed when the rotary member including another prime mover is rotated by the power of the predetermined prime mover.

The above and further objects and novel features of this invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENT

Figure 2:
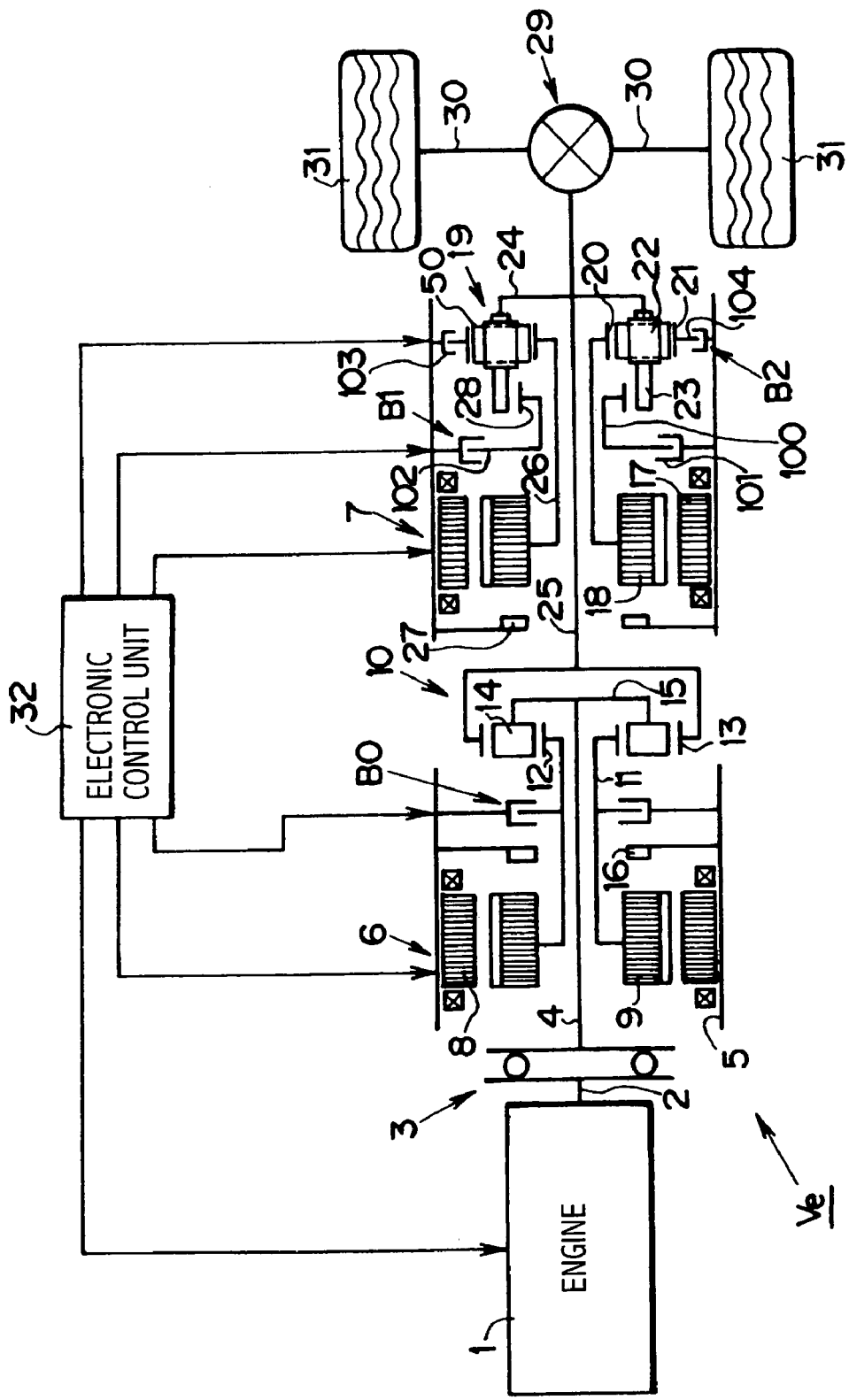
FIG. 2 is a conceptional diagram showing a power train and a control line of a hybrid vehicle to which this invention is applied.

Next, this invention will be described specifically with reference to the accompanying drawings. FIG. 2 is a schematic construction diagram of an F•R (i.e., front engine rear drive) type hybrid vehicle (as will be called "vehicle" hereinafter) Ve, which is one example of the invention. The vehicle Ve has an engine 1 as a first prime mover.

An internal combustion engine, specifically, a gasoline engine, a diesel engine, an LPG engine or the like can be employed as said engine 1. An input shaft 4 is connected to a crankshaft 2 of the engine 1 through a dumper mechanism 3. Also, there is provided a casing 5 in which two motor generators 6 and 7 (MG2) are arranged. Those motor generators 6 and 7 have a power mode function to convert electric energy into motive energy, and a regenerating function to convert the motive energy into the electric energy. One of the motor generators 6 has a stator 8 and a rotor 9, and the stator 8 is fixed to the casing 5.

Moreover, there is provided a power distribution device 10 in the casing 5. This power distribution device 10 comprises a single pinion type planetary gear mechanism. Specifically, the power distribution device 10 has a sun gear 12 formed on a hollow shaft 11, a ring gear 13 arranged concentrically with the sun gear 12 and a carrier 15 holding a pinion gear 14 meshing with the sun gear 12 and the ring gear 13. The input shaft 4 and the carrier 15 are connected to rotate integrally. Moreover, the input shaft 4 is arranged in the hollow shaft 11, and the input shaft 4 and the hollow shaft 11 can rotate relatively. Moreover, there is provided a resolver 16 for detecting a rotating state of the rotor 9 of the motor generator 6, specifically, a rotation angular acceleration, the speed and so on. Furthermore, there is provided a brake B0 for interchanging the hollow shaft 11, the rotor 9 and the sun gear 12 between a rotatable state and a fixed state.

On the other hand, another motor generator 7 has a function as another prime mover of the vehicle Ve, and equipped with a stator 17 and a rotor 18. The stator 17 is fixed to the casing 5.

Moreover, there is provided a transmission 19 in the casing 5. In the example shown in FIG. 2, this transmission 19 is constructed of a pair of Ravigneaux type planetary gear mechanisms. Specifically, the transmission 19 has two sun gears 28 and 20 or external gears arranged coaxially, and a ring gear 21 or an internal gear arranged coaxially with those sun gears 28 and 20. Moreover, a diametrically small pinion gear 23 meshes with said sun gear 28, and a diametrically large pinion gear 22 is provided so as to rotate integrally and coaxially with the diametrically small pinion gear 23. Furthermore, the diametrically large pinion gear 22 meshes with a short pinion gear 50. The short pinion gear 50 meshes with said sun gear 20 and ring gear 21. Here, the diametrically large pinion gear 22 and the diametrically small pinion gear 23 are so held by a carrier 24 as to rotate integrally; the short pinion gear 50 is held by a carrier 24 rotatably; and the diametrically large pinion gear 22, the diametrically small pinion gear 23 and the short pinion gear 50 are so held integrally by the carrier 24 as to revolve around the carrier 24.

Thus, the sun gear 28 and the ring gear 21 compose a mechanism corresponding to a double pinion type planetary gear mechanism together with the diametrically small pinion gear 23 and the short pinion gear 50. Also, the sun gear 20 and the ring gear 21 compose a mechanism corresponding to the single pinion type planetary gear mechanism together with the short pinion gear 50.

Moreover, the carrier 24 and an output shaft 25 are connected to rotate integrally, and the input shaft 4 and the output shaft 25 are arranged coaxially. Also, the output shaft 25 and the ring gear 13 of the power distribution device 10 are connected to rotate integrally. A hollow shaft 26 is fitted to outside of the output shaft 25 to rotate relatively. This hollow shaft 26 and the rotor 18 of the motor generator 7 are connected to rotate integrally. Furthermore, there is provided a resolver 27 for detecting the rotating state of the rotor 18 of the motor generator 7, specifically, the rotation angular acceleration, the speed and so on.

The hollow shaft 26 and the sun gear 20 are connected to rotate integrally. Moreover, said sun gear 28 is formed around a hollow shaft 100, the hollow shaft 100 is installed outside of the hollow shaft 26, and the hollow shaft 26 and the hollow shaft 100 are capable of rotating relatively. Moreover, there is provided a brake B1 for interchanging the sun gear 28 and the hollow shaft 100 between the rotatable state and the fixed state. Furthermore, there is provided a brake B2 for interchanging the ring gear 21 between the rotatable state and the fixed state. Those brakes B1 and B2 construct a part of the transmission 19.

In this embodiment, a hydraulic type frictional engagement mechanism, in other words, a wet frictional brake is employed as the brakes B1 and B2. Specifically, the brake B1 comprises a frictional member 101 installed on the casing 5 side, and a frictional member 102 installed on the hollow shaft 100 side. On the other hand, the brake B2 comprises a frictional member 103 installed on the casing 5 side, and a frictional member 104 installed on the ring gear 21 side. Here, an output member (not shown) of a differential 29 and the output shaft 25 are connected each other, and the output member (not shown) of the differential 29 and a drive shaft 30 are connected each other. Moreover, wheels 31 are connected to the drive shaft 30.

Next, a control line of the vehicle Ve will be described hereafter. There is provided an electronic control unit 32, into which a signals of a vehicle speed, an acceleration demand, a braking demand, a rotating state of the motor generators 6 and 7 and so on are inputted. From the electronic control unit 32, a signal to control the engine 1, a signal to control the output of the motor generators 6 and 7 (torque×speed) and a signal to control the brakes B0, B1, and B2 are outputted.

Next, a control of the vehicle Ve will be described hereafter. First of all, in case of activating the engine 1 when the vehicle Ve stops, the motor generator 6 is driven as an electric motor thereby to carry out a control for cranking the engine 1 by the torque of the motor generator 6. Specifically, the ring gear 13 functions as a reaction element to rotate the carrier 15, while the brake B0 is released and the torque of the motor generator 6 is transmitted to the sun gear 12. The torque of the carrier 15 is transmitted to the crankshaft 2 through the input shaft 4. By thus cranking the engine 1 and burning a fuel, the engine speed reaches a number of revolutions such that the engine 1 is allowed to rotate autonomously.

In case the acceleration demand is increased after the engine 1 is activated and the engine torque is transmitted to the carrier 15 of a power transmission mechanism 10, moreover, the motor generator 6 is driven as the electric generator to generate a reaction force of the engine torque, and the speed of the motor generator 6 is controlled, so as to control the engine speed and to increase the speed of the ring gear 13. Then, the torque of the ring gear 13 is transmitted to the wheels 31 through the output shaft 25, the differential 29 and the drive shaft 30, thereby to generate the driving force. It is also possible to drive the motor generator 7 as the electric generator, and to transmit the torque thereof to the wheels 31.

Next, control examples of individual brakes B0, B1 and B2 and the motor generator 7 will be described hereinafter. The contents of controls of those brakes B0, B1 and B2 and the motor generator 7 are determined on the basis of a mode to be selected. In this embodiment, it is possible to select a low-speed mode and a high-speed mode, and the high-speed mode includes a normal mode and a cruising mode. Each mode is selected on the basis of the vehicle speed, the demand torque and so on. Here, the demand torque means a target value of the torque outputted from the motor generator 7. Hereinafter, the modes to be selected and the controls to be carried out in the selected mode will be described.

(Low-speed Mode)

In case the vehicle speed is lower than the predetermined speed and the demand torque is higher than the predetermined torque, for example, the low-speed mode is selected. The predetermined torque is the torque higher than zero. In case the low-speed mode is selected, the control to release the brakes B0 and B1, and to apply the brake B2 is carried out. In case this control is carried out, the engine torque is transmitted to the wheels 31 through the power distribution device 10, the output shaft 25 and the differential 29. Also, the motor generator 7 is driven as the electric generator, and the ring gear 21 functions as a reaction element, so as to transmit the torque of the motor generator 7 to the differential 29 through the sun gear 20 and the carrier 24.

In case the vehicle speed exceeds the predetermined speed and the demand torque is lower than the predetermined torque, for example, the high-speed mode is selected. If the demand torque is higher than zero Newton in this high-speed mode, the normal mode is selected. If the demand torque is lower than zero Newton (i.e., in case of light load), on the other hand, the cruising mode is selected. First, in case the normal mode is selected, the control to release the brakes B0 and B2, and to apply the brake B2 is carried out. Moreover, the motor generator 7 is driven as the electric generator, and the sun gear 28 functions as a reaction element so as to transmit the torque of the motor generator 7 to the differential 29 through the carrier 24.

(High-Speed Mode)

In case the vehicle speed exceeds the predetermined speed and the demand torque is lower than the predetermined torque, for example, the high-speed mode is selected. If the demand torque is higher than zero Newton in this high-speed mode, the normal mode is selected. If the demand torque is lower than zero Newton (i.e., in case of light load), on the other hand, the cruising mode is selected. First, in case the normal mode is selected, the control to release the brakes B0 and B2, and to apply the brake B2 is carried out. Moreover, the motor generator 7 is driven as the electric generator, and the sun gear 28 functions as a reaction element so as to transmit the torque of the motor generator 7 to the deferential 29 through the carrier 24.

Specifically, the rotational speed of the motor generator 7 is reduced by the transmission 19, and the torque of the motor generator 7 is transmitted to the output shaft 25. Here, the gear ratio of the transmission 19 of the case in which the normal mode is selected is smaller than that of the case in which the low-speed mode is selected. In short, the gear ratio of the transmission 19 of the case in which the normal mode is selected is "high (i.e., a small gear ratio)". In case, too, the normal mode is selected, both of torques of the engine 1 and the motor generator 7 are transmitted to the wheels 31.

In case the cruising mode is selected, on the other hand, the control to release the brakes B1 and B2, and to apply the brake B0 is carried out. In case the brakes B1 and B2 are thus released, the power transmission at the power transmission route between the output shaft 25 and the motor generator 7 is substantially interrupted. As a result, in case of transmitting the power of the engine 1 to the wheels 31 through the output shaft 25 and the differential 29, a part of power of the engine 1 is not transmitted to the motor generator 7 and the rotor 18 is not rotated. Accordingly, the power loss of the engine 1 can be suppressed and the deterioration in the fuel consumption can also be suppressed.

Here, in case the cruising mode is selected, the brake B0 is also applied so that the rotor 9 of the motor generator 6 can not be rotated when transmitting the power of the engine 1 from the input shaft 4 to the output shaft 25. Therefore, the power loss of the engine 1 can be further suppressed and the deterioration in the fuel consumption can also be further suppressed.

Figure 3:
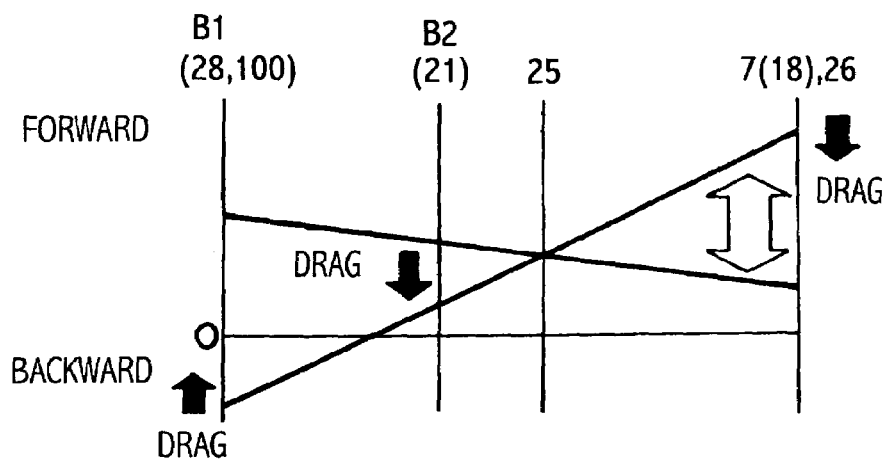
FIG. 3 is a nomographic diagram showing a state of rotary members of the power train shown in FIG. 2.

Next, here will be specifically described a power loss resulting from the transmission of the power of the engine 1 to the rotary member including the motor generator 7, in case the cruising mode is selected and the brakes B1 and B2 are released. Here, the aforementioned power loss may be called "a drag loss" for the sake of convenience. This drag loss will be described below with reference to a nomographic diagram in FIG. 3. In FIG. 3, there are shown: the rotational speeds of the sun gear 28 and the hollow shaft 100 as rotary members of which the rotational speed is controlled by the brake B1; the rotational speed of the ring gear 21 as a rotary member of which the rotational speed is controlled by the brake B2; the rotational speed of the output shaft 25; and the rotational speeds of the rotor 18 of the motor generator 7 and the hollow shaft 26. In FIG. 3, "forward" means that the rotary member rotates in a forward direction; "backward" means that the rotary member rotates in a backward direction; and "zero" means that the rotary member stops. Here "forward direction" means the same rotational direction as that of the engine 1.

Assuming that the rotational speed of the output shaft 25 is constant, the rotational speeds of the sun gear 28, the hollow shaft 100 and the ring gear 21 are changed in conjunction with the change in the rotational speeds of the rotor 18 of the motor generator 7 and the hollow shaft 26. In case the power of the engine 1 is transmitted to the transmission 19 and the motor generator 7 though the output shaft 25, a part of the power is converted into: a motive energy to rotate the ring gear 21; a motive energy to rotate the sun gear 28 and the hollow shaft 100; a motive energy to rotate the rotor 18 of the motor generator 7 and the hollow shaft 26; a thermal energy arising from the viscosity resistance of the oil interposed between the frictional members 101 and 102; and a thermal energy arising from the viscosity resistance of the oil interposed between the frictional members 103 and 104. As a result of this, the power loss occurs. In FIG. 3, the arrow with a caption "drag" indicates a torque in the direction to lower the rotational speed of the rotary members.

Figure 4:
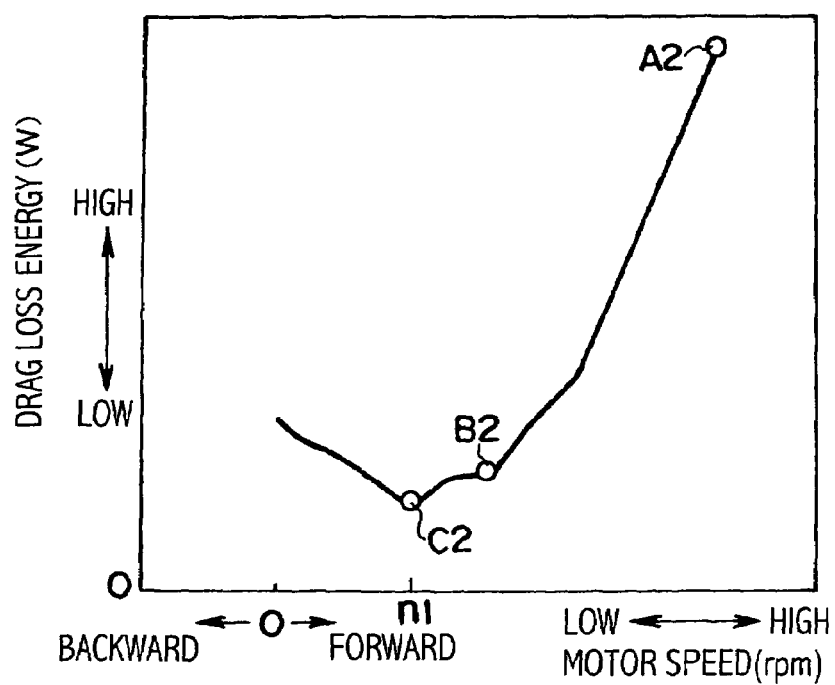
FIG. 4 is a diagram showing a relation between drag loss energy and speed of the motor generator.

FIG. 4 shows an example of a diagram showing a relation between drag loss energy and the rotational speed of the motor generator of the case in which the power of the engine 1 is transmitted to the output shaft 25 at the predetermined vehicle speed in this embodiment. Here, "drag loss energy" means an energy to be dissipated by the torque corresponding to "drag". In FIG. 4, moreover, there is shown the speed of the motor generator 7 as a parameter equivalent to the rotational speed of the motor generator 7. In case the speed of the motor generator is smaller than a predetermined speed $n1$ or lower, as shown in FIG. 4, the drag loss energy tends to decrease in conjunction with the increase in the speed of the motor generator 7 in the forward direction from zero. On the contrary, in case the speed of the motor generator 7 reaches the predetermined speed $n1$ or higher, the drag loss energy tends to increase in connection with a rise in the speed of the motor generator.

Figure 5:
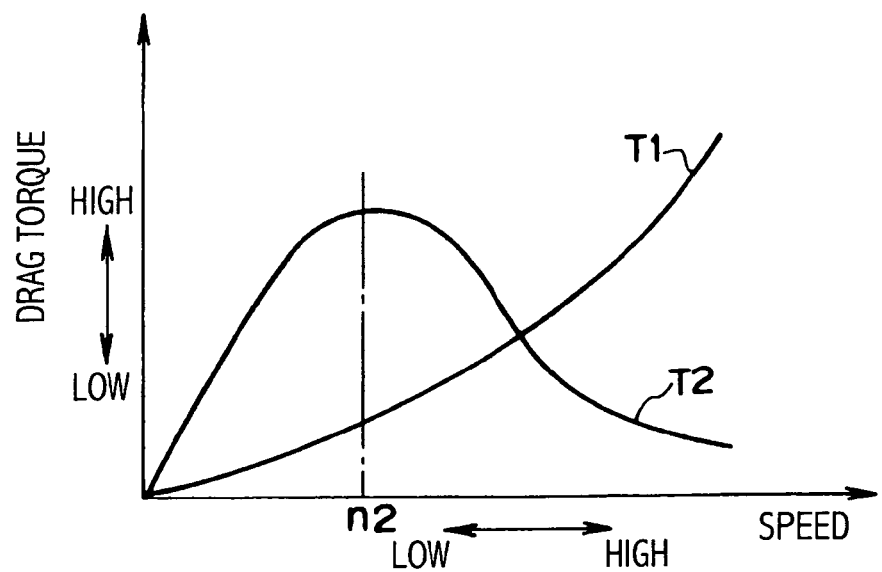
FIG. 5 is a diagram showing a relation between speed of the rotary members as participates in the drag loss and a drag torque.

The reason that the drag loss energy varies as the diagram in FIG. 4 will be described with reference to FIG. 5. FIG. 5 is a diagram showing a corresponding relation between the speed of the rotary member as participates in the drag loss and the drag torque. The drag torque is a parameter equivalent to the drag loss energy, and the drag loss energy increases in connection with the increase in the drag torque. In FIG. 5, there is shown a first drag torque $T1$ and a second drag torque $T2$. The first drag torque $T1$ is the drag torque generated by the rotations of the rotor 18 of the motor generator 7 and the hollow shaft 26. On the other hand, the second drag torque $T2$ is the drag torque generated by the rotations of the ring gear 21, the gear 28, the hollow shaft 100, the frictional members 102 and 104. In short, "drag" includes a "concurrent rotation" of one rotary member resulting from the transmission of the power of another rotary member.

As shown in FIG. 5, the first drag torque $T1$ tends to rise in proportion to the rise in the speed of the rotary member. On the contrary, the second drag torque $T2$ tends to rise in conjunction with the rise in the speed of the rotary member, in case the speed of the rotary member is lower than a predetermined speed $n2$. On the other hand, the second drag torque $T2$ tends to fall in case the speed of the rotary member reaches the predetermined speed $n2$ or higher. The drag loss energy shown in FIG. 4 is calculated on the basis of the sum of the first drag torque $T1$ and the second drag torque $T2$ shown in FIG. 5.

Figure 6:
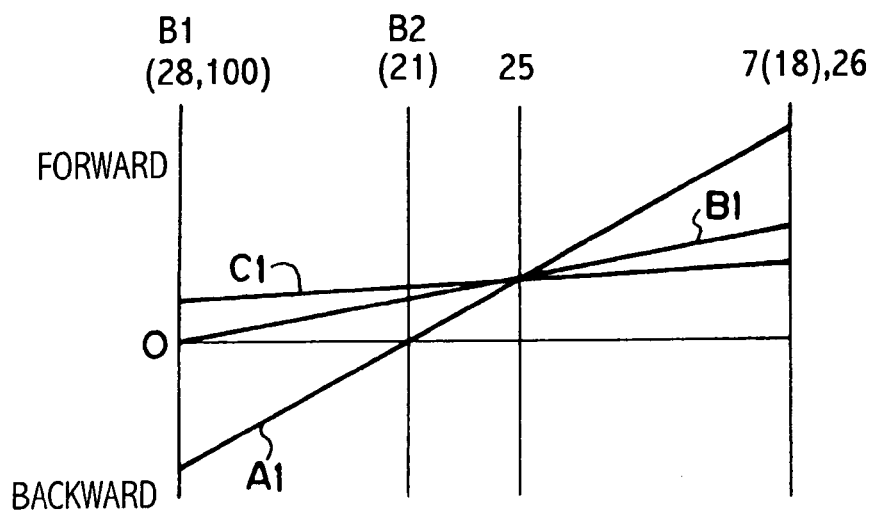
FIG. 6 is a nomographic diagram showing a state of the rotary member of the power train shown in FIG. 2.

Here will be described one example of the corresponding relation between the rotational speed of the rotary member as participates in the drag loss and the drag loss energy with reference to FIGS. 4 and 6. In the nomographic diagram of FIG. 6, a segment $A1$ represents the rotational speed corresponding to the case in which the transmission 19 is controlled to "low", a segment $B1$ represents the rotational speed corresponding to the case in which the transmission 19 is controlled to "high", and a segment $C1$ represents the rotational speed corresponding to an optimum operation point $C2$ in FIG. 4. The optimum operation point $C2$ means the speed of the motor generator at which the drag loss energy becomes the lowest (minimum). In FIG. 4, moreover, an operation point $A2$ indicates the speed of the motor generator corresponding to the aforementioned "low", and an operation point $B2$ indicates the speed of the motor generator corresponding to the aforementioned "high".

Figure 1:
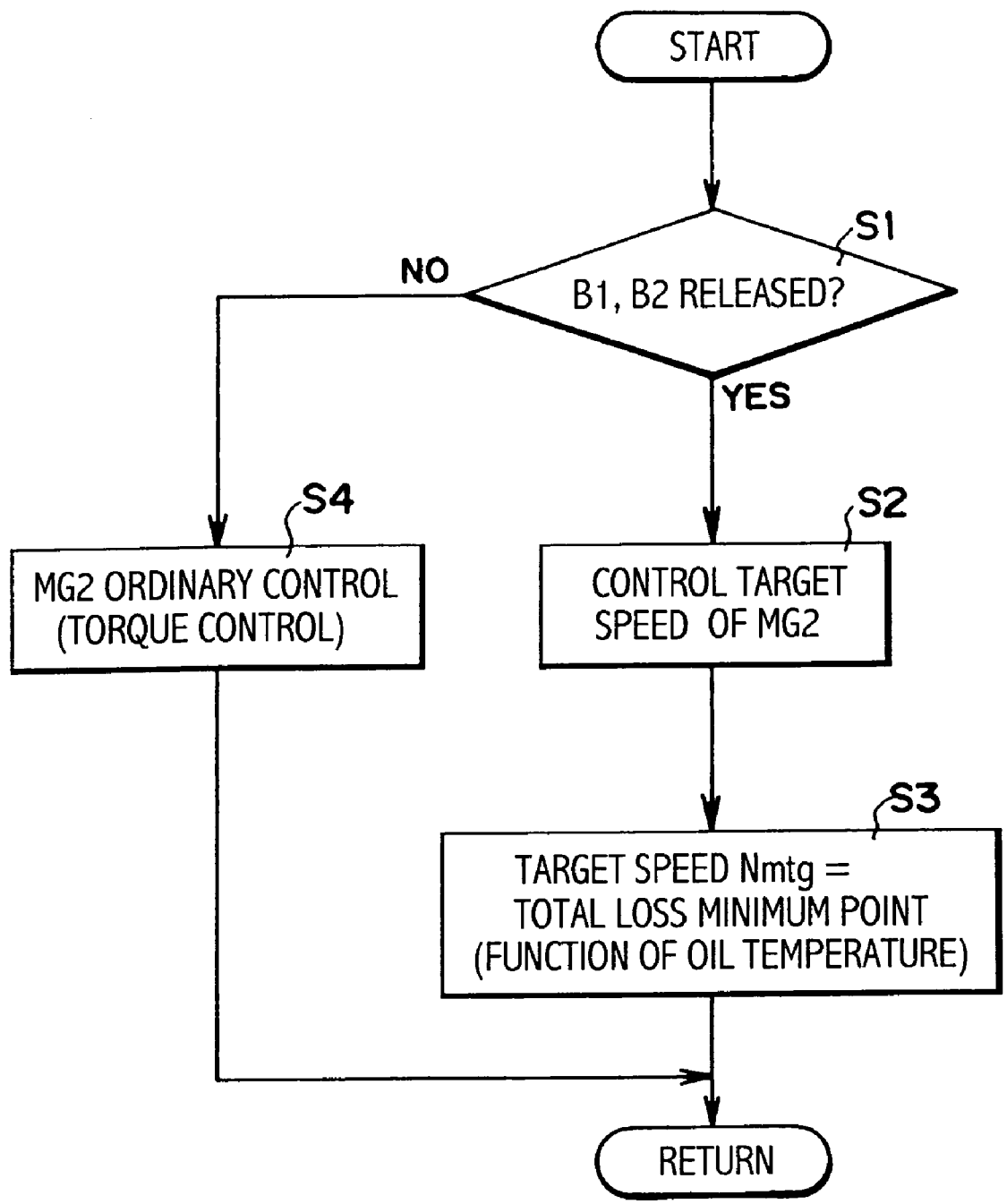
FIG. 1 is a flowchart showing one example of this invention.

Next, here will be described an example of a suppression of power loss of the engine 1 on the basis of FIGS. 4 and 6, with reference to the flowchart in FIG. 1. First of all, it is decided (at Step S1) whether or not both of the brakes B1 and B2 are released. At Step S1, it is possible to carry out a control to decide that "the brakes B1 and B2 are completely released" at an instant after a lapse of the preset time from the start of the control to release the brakes B1 and B2, in order to precisely decide that the brakes B1 and B2 are completely released.

In case the answer of Step S1 is YES, a control of a target speed of the motor generator 7 is started (at Step S2). Subsequent to Step S2, the optimum operation point C2 in FIG. 4 is selected (at Step S3) as a target speed Nmtg of the motor generator 7, and this routine is returned.

Here, the drag loss energy described with reference to FIGS. 4 and 5 is varied in accordance with the vehicle speed. When low-temperature and high-viscosity oil is fed for lubricating and cooling the aforementioned brakes B1 and B2, moreover, the drag loss torque in the brakes B1 and B2 may increase. Moreover, a lubricating oil fed around the crankshaft 2 of the engine 1 for the purpose of lubrication and cooling may increase the power loss, if the viscosity of oil is increased according to the temperature.

In case of carrying out the control of Step S3, consequently, it is possible to set or correct the optimum operation point C2 by utilizing, as a function, parameters such as the vehicle speed, the oil temperature, a water temperature in the engine or etc.

In case the answer of Step S1 is NO, on the contrary, the output of the motor generator 7 is controlled (at Step S4) on the basis of the aforementioned demand torque, and this routine is returned. The control to be carried out at Step S4 is different from the speed control of the motor generator 7 at Step S3, and a torque control is to be executed on this occasion. It comes near to stating the obvious that various kinds of data necessary for carrying out the control example shown in FIG. 1 is mapped and stored in the electronic control unit 32, and that necessary signals for carrying out the control example in FIG. 1 are inputted into the electronic control unit 32.

As described above, according to this embodiment, in case both of the brakes B1 and B2 are released, the drag loss energy caused by the transmission of the power of the engine 1 to the rotary member including the motor generator 7 is decided. By controlling the speed of the rotary member including the motor generator 7 so as to make the drag loss energy maximum, the power loss of the engine 1 can be suppressed.

Figure 7:
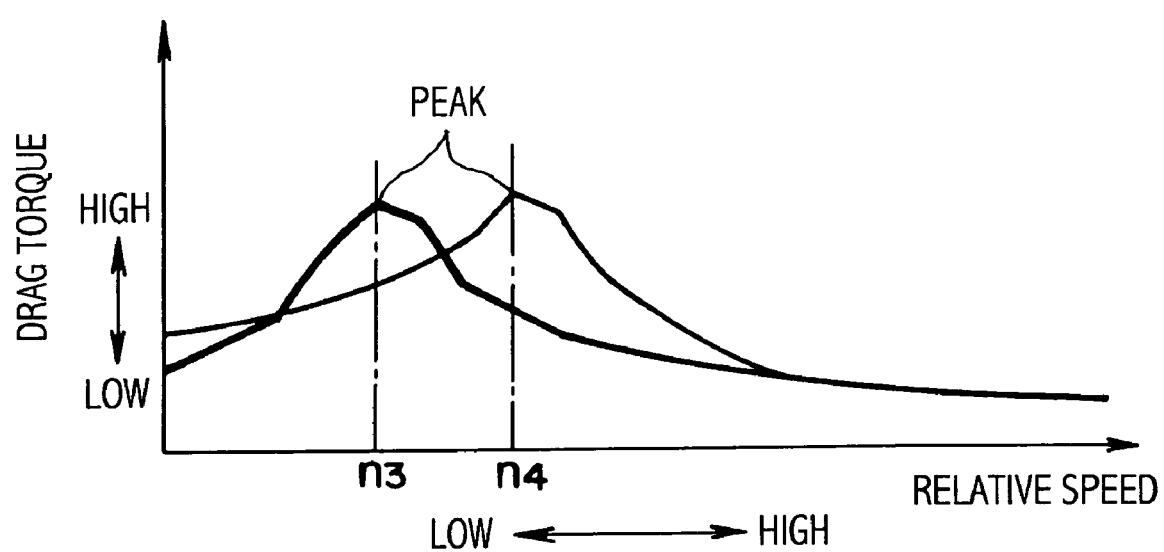
FIG. 7 is a diagram showing a relation between the drag torque and a relative rotating speed between the frictional members as participates in the drag torque.

With respect to the second drag torque T2 described on the basis of FIG. 5, a relation between a relative rotating speed of the frictional members constructing the brakes B1 and B2, and the drag torque is shown in FIG. 7. As can be seen from FIG. 7, in case the relative rotating speed of the frictional members is lower than a preset speed, there is exhibited a characteristic in which the drag torque increases in proportion as the rise in speed, however, in case the relative rotating speed of the frictional members is higher than a preset speed, on the contrary, there is exhibited a characteristic in which the drag torque decreases in proportion as the rise in revolution.

In this connection, the relative rotating speed between the frictional members can be set so as to maximize the second drag torque T2 shown in FIG. 5, by changing a frictional coefficient of the frictional member. As shown in FIG. 7, for example, it is possible to set to a relative rotating speed n3 or n4. Thus, the optimum operating point of the motor generator can be adjusted by adjusting the frictional coefficient of the frictional member. As a result, in FIG. 4, it is also possible to set the frictional coefficient of the frictional member so as to make a difference between the speed of the motor generator 7 in case the transmission 19 is controlled to "high" and the speed of the motor generator 7 corresponding to the optimum operation point C2 within a preset value.

With this construction, when the state where the brakes B1 and B2 are released and controlled to the optimum operation point C2 is changed into the state where the brake B1 is applied in order to set "high" in the transmission 19, the shocks arising from the engagement of the brake B1 can be lightened. In other words, it is possible to achieve the improvement not only in the fuel consumption by suppressing the power loss, but also in drivability by suppressing the shocks.

Here will be described a corresponding relation between the functional means shown in FIG. 1 and the construction of the invention. The means for executing Steps S1, S2 and S3 corresponds to the deciding means of the invention, and the means for executing Step S3 corresponds to the control means of the invention. Moreover, a corresponding relation between the particulars described in this embodiment and the construction of the invention will be described hereafter. The engine 1 and the motor generator 7 correspond to a plurality of prime movers of the invention; the engine 1 corresponds to the predetermined prime mover of the invention; the motor generator 7 corresponds to another prime mover of the invention; the vehicle Ve corresponds to the hybrid vehicle of the invention; the motor generator 7, the hollow shaft 26 and the rotary members constituting the transmission 19, specifically, the hollow shaft 100, the sun gear 28, the ring gear 21, the frictional members 101, 102, 103 and 104 and so on correspond to "the rotary members including another prime mover" as objects of "decision of the power loss". Moreover, the motor generator 7 and the hollow shaft 26, the rotary members constituting the transmission 19, specifically, the hollow shaft 100, the sun gear 28, the ring gear 21, the frictional members 102 and 104 and so on correspond to "the rotary members including another prime mover" as objects of "control of the rotating state". Specifically, "the rotary members including another prime mover" as objects of "decision of the power loss", and "the rotary members including another prime mover" as objects of "control of the rotating state" are not completely congruent with each other. This is because the frictional members 101 and 103 are installed on the casing 5 side so that their rotating states can not be controlled. Moreover, the motor generator 6 corresponds to the motor generator of the invention, the brake B1 corresponds to the first engagement mechanism of the invention, the brake B2 corresponds to the second engagement mechanism of the invention, the frictional members 101 and 102 correspond to two members of the first engagement mechanism of the invention, and the frictional members 103 and 104 correspond to two members of the second engagement mechanism of the invention. Moreover, physical quantities of the power loss, the drag loss, the drag loss energy and so on are included in the power loss of the invention. Furthermore, the speed and the rotational speed of the rotary member correspond to "the rotating state of the rotary member". The case, in which both of individual brakes B1 and B2 are released and the power transmission between the motor generator 7 and the output shaft 25 are interrupted, corresponds to "the case in which the power to be transmitted from the another prime mover to the wheels is smaller than the preset value".

Although the frictional brake is employed as the brake in the aforementioned embodiment, it is possible to employ, e.g., an electromagnetic brake. A clutch can also be employed instead of the brake in accordance with the construction of the rotary members. In this case, a frictional clutch, an electromagnetic clutch, a positive clutch and so on can be employed. Although the engine and the motor generator individually having different principles of generation of the power are employed as a plurality of the prime movers in this embodiment, this invention can also be applied to a vehicle having other combination of the prime movers. For example, a combination of a flywheel system and a motor generator, a combination of an engine and a flywheel system, a combination of a gas turbine and a flywheel system can be exemplified as the combination of a plurality of prime movers.

The power distribution device described in the embodiment has the single pinion type planetary gear mechanism. However, it is also possible to employ a power distribution device having a double pinion type planetary gear mechanism. Moreover, the transmission described in the above embodiment is a discontinuous transmission capable of controlling the gear ratio in two phases, however, this invention can also be applied to a vehicle having a continuously variable transmission. Furthermore, the output shafts (i.e., the crankshaft 2 and the rotor 18) of a plurality of prime movers are arranged concentrically with each other in a longitudinal direction in the vehicle shown in FIG. 2, however, this invention can also be applied to a vehicle in which the output shafts of a plurality of prime movers are arranged unconcentrically, or in which the output shafts of a plurality of prime movers are arranged in a width direction.

What is claimed is:

1. A control system for a hybrid vehicle wherein a plurality of prime movers and wheels are connected in a power transmittable manner, comprising:
   a decider for deciding a power loss of the case in which a power of a predetermined prime mover, which is one of a plurality of the prime movers, is transmitted to rotary members including another prime mover;
   a controller for controlling a rotating state of said rotary members including said another prime mover on the basis of a decision result of the decider;
   a first engagement mechanism for transmitting the torque by applying two members rotating relatively, which is provided on the output side of said another prime mover; and
   a second engagement mechanism for transmitting the torque by applying two members rotating relatively, which is provided on the output side of said another prime mover;
   wherein said rotary members include a member of the first engagement mechanism and a member of the second engagement mechanism; and
   wherein said decider includes means for deciding the power loss when both of said engagement mechanisms are in a releasing state.

2. A control system according to claim 1,
   wherein said decider includes means for deciding a power loss resulting from concurrent rotation of said another prime mover by the power of the predetermined prime mover, in case said predetermined prime mover is outputting the power.

3. A control system according to claim 1,
   wherein said first engagement mechanism includes a wet frictional engagement mechanism in which oil is interposed between the two members, and
   wherein said second engagement mechanism includes the wet frictional engagement mechanism which in which the oil is interposed between the two members.

4. A control system according to claim 1, further comprising:
   a power distribution device for transmitting the power of said predetermined prime mover to at least one of said wheels or said motor generator.

5. A control system for a hybrid vehicle wherein a plurality of prime movers and wheels are connected in a power transmittable manner, comprising:
   a decider for deciding a power loss of the case in which a power of a predetermined prime mover, which is one of a plurality of the prime movers, is transmitted to rotary members including another prime mover; and
   a controller for controlling a rotating state of said rotary members including said another prime mover on the basis of a decision result of the decider,
   wherein said controller includes means for controlling a speed of said another prime mover so as to minimize a total sum of: the power loss caused by the rotation of said another prime mover; the power loss caused by the relative rotation between two members in a first engagement mechanism for transmitting torque; and the power loss caused by the relative rotation between two members in a second engagement mechanism for transmitting torque.

6. A control system according to claim 5,
   wherein said controller includes means for controlling the rotating state of the rotary members including said another prime mover so as to minimize said power loss by using, as a parameter, at least one of: a vehicle speed; a temperature of oil interposed between said two members in the first engagement mechanism and between said two members in the second engagement mechanism; and a temperature of a cooling water of the predetermined prime mover.

7. A control system for a hybrid vehicle wherein a plurality of prime movers and wheels are connected in a power transmittable manner, comprising:
   a decider for deciding a power loss of the case in which a power of a predetermined prime mover, which is one of a plurality of the prime movers, is transmitted to rotary members including another prime mover;
   a controller for controlling a rotating state of said rotary members including said another prime mover on the basis of a decision result of the decider; and
   a transmission having two engagement mechanisms on a power transmission route from said another prime mover to said wheels.

8. A control system for a hybrid vehicle wherein a plurality of prime movers and wheels are connected in a power transmittable manner, comprising:
   deciding means for deciding a power loss of the case in which a power of a predetermined prime mover, which is one of a plurality of the prime movers, is transmitted to rotary members including another prime mover;
   control means for controlling the rotating state of said rotary members including said another prime mover on the basis of a decision result of the deciding means;
   a first engagement mechanism for transmitting the torque by applying two members rotating relatively, which is provided on the output side of said another prime mover;

a second engagement mechanism for transmitting the torque by applying two members rotating relatively, which is provided on the output side of said another prime mover;

wherein said rotary members include the member of the first engagement mechanism and the member of the second engagement mechanism; and wherein said deciding means includes means for deciding the power loss when both of said engagement mechanisms are in the releasing state.

9. A control system according to claim 8, wherein said deciding means includes means for deciding a power loss resulting from concurrent rotation of said another prime mover by the power of the predetermined prime mover, in case said predetermined prime mover is outputting the power.

10. A control system according to claim 8, wherein said first engagement mechanism includes a wet frictional engagement mechanism in which oil is interposed between the two members, and wherein said second engagement mechanism includes the wet frictional engagement mechanism in which the oil is interposed between the two members.

11. A control system according to claim 8, further comprising:

a power distribution device for transmitting the power of said predetermined prime mover to at least one of said wheels or said motor generator.

12. A control system for a hybrid vehicle wherein a plurality of prime movers and wheels are connected in a power transmittable manner, comprising:

deciding means for deciding a power loss of the case in which a power of a predetermined prime mover, which is one of a plurality of the prime movers, is transmitted to rotary members including another prime mover; and control means for controlling the rotating state of said rotary members including said another prime mover on the basis of a decision result of the deciding means, wherein said control means includes means for controlling the speed of said another prime mover so as to minimize the total sum of: the power loss caused by the rotation of said another prime mover; the power loss caused by the relative rotation between two members in a first engagement mechanism for transmitting torque; and the power loss caused by the relative rotation between two members in a second engagement mechanism for transmitting torque.

13. A control system for a hybrid vehicle wherein a plurality of prime movers and wheels are connected in a power transmittable manner, comprising:

deciding means for deciding a power loss of the case in which a power of a predetermined prime mover, which is one of a plurality of the prime movers, is transmitted to rotary members including another prime mover;

control means for controlling the rotating state of said rotary members including said another prime mover on the basis of a decision result of the deciding means; and a transmission having two engagement mechanisms on the power transmission route from said another prime mover to said wheels.

14. A control system for a hybrid vehicle wherein a plurality of prime movers and wheels are connected in a power transmittable manner, comprising:

deciding means for deciding a power loss of the case in which a power of a predetermined prime mover, which is one of a plurality of the prime movers, is transmitted to rotary members including another prime mover; and control means for controlling the rotating state of said rotary members including said another prime mover on the basis of a decision result of the deciding means, wherein said deciding means includes means for deciding a power loss resulting from concurrent rotation of said another prime mover by the power of the predetermined prime mover, in case said predetermined prime mover is outputting the power, wherein said control means includes means for controlling the rotating state of the rotary members including said another prime mover so as to minimize said power loss by using, as a parameter, at least one of: the vehicle speed; the temperature of oil interposed between said two members in a first engagement mechanism and between said two members in a second engagement mechanism; and the temperature of the cooling water of the predetermined prime mover.

15. A control method for a hybrid vehicle wherein a plurality of prime movers and wheels are connected in a power transmittable manner, comprising:

a first step for deciding a power loss of the case in which a power of a predetermined prime mover, which is one of a plurality of a prime movers, is transmitted to rotary members including another prime mover; and a second step for controlling a rotating state of said rotary member including said another prime mover on the basis of a decision result of the first steps, wherein the rotating state of the rotary members including said another prime mover is controlled at said first step, in case the power transmitted from said another prime mover to said wheels is smaller than a preset value.

16. A control method according to claim 15, wherein the rotating state of the rotary members including said another prime mover is controlled at said first step so as to minimize said power loss.

17. A control method for a hybrid vehicle wherein a plurality of prime movers and wheels are connected in a power transmittable manner, comprising:

a first step for deciding a power loss of the case in which a power of a predetermined prime mover, which is one of a plurality of a prime movers, is transmitted to rotary members including another prime mover; and a second step for controlling a rotating state of said rotary member including said another prime mover on the basis of a decision result of the first step, wherein the rotating state of the rotary members including said another prime mover is controlled at said first step so as to minimize said power loss, wherein the rotating state of the rotary members including said another prime mover is controlled at said first step so as to minimize said power loss by using, as a parameter, at least one of: a vehicle speed; a temperature of oil to which said rotary member contacts; and a temperature of a cooling water of the predetermined prime mover.

18. A control method for a hybrid vehicle wherein a plurality of prime movers and wheels are connected in a power transmittable manner, comprising:

a first step for deciding a power loss of the case in which a power of a predetermined prime mover, which is one of a plurality of a prime movers, is transmitted to rotary members including another prime mover; and a second step for controlling a rotating state of said rotary member including said another prime mover on the basis of a decision result of the first step, wherein said rotary members include a member of a first engagement mechanism which transmits torque by applying two members rotating relatively, and a member of a second engagement mechanism which transmits torque by applying two members rotating relatively, wherein the power loss is decided in the first step when both of said engagement mechanisms are in a releasing state.

19. A control system for a hybrid vehicle wherein a plurality of prime movers and wheels are connected in a power transmittable manner, comprising:

a rotary member including another prime mover, in which an optimum operation point where a drag loss energy caused by rotation by a torque transmitted from a predetermined prime mover is minimized, is at a speed higher than zero;

deciding means for deciding a power loss of the case in which a power of said predetermined prime mover is transmitted to rotary members; and control means for controlling a speed of said rotary members to said optimum operation point on the basis of a decision result of the deciding means.

* * * * *